United States Patent [19]

Opdahl

[11] Patent Number: 4,598,882

[45] Date of Patent: Jul. 8, 1986

[54] LOW PROFILE DEPLOYMENT/RETRIEVAL SYSTEM

[75] Inventor: Everett W. Opdahl, Lutherville, Md.

[73] Assignee: Westinghouse Electric Corp., Pittsburgh, Pa.

[21] Appl. No.: 612,277

[22] Filed: May 21, 1984

[51] Int. Cl.[4] .............................................. G64D 3/00
[52] U.S. Cl. ................... 244/1 TD; 244/1 R; 254/389; 114/253
[58] Field of Search ........................ 244/1 TD, 1 R; 254/389–417; 242/157 R; 226/196, 199; 114/244, 245, 253, 254

[56] References Cited

U.S. PATENT DOCUMENTS

| 150,186 | 4/1874 | Pollitt | 254/389 |
| 386,826 | 7/1888 | Howard | 254/417 |
| 1,547,938 | 7/1925 | Miller | 254/389 |
| 1,552,161 | 9/1925 | Houghton | 254/417 |
| 2,652,654 | 9/1953 | Bahn | 43/24 |
| 3,804,372 | 4/1974 | Fuchs | 254/417 |
| 4,163,591 | 8/1979 | Hennig et al. | 308/3.5 |
| 4,285,501 | 8/1981 | Schneider | 254/394 |

FOREIGN PATENT DOCUMENTS 954367 8/1982 U.S.S.R. .............................. 254/417

Primary Examiner—Galen L. Barefoot
Assistant Examiner—Rodney Corl
Attorney, Agent, or Firm—D. Schron

[57] ABSTRACT

A towed body deployment/retrieval system which includes first and second hollow arms for passage of a cable from a winch to the towed body. The adjacent ends of the arms include forked fittings which are in cooperative engagement with a slip boundary sheave having, in a peripheral channel thereof, an endless belt slidable in the channel and having a groove which receives the cable. The arms are movable relative to the slip boundary sheave over a limited distance during normal usage. The slip boundary sheave rotates about an effective center located outside of its contour and accordingly is much smaller and can fit into a smaller space than an equivalent circular sheave which would normally be required for the same diameter towing cable.

7 Claims, 15 Drawing Figures

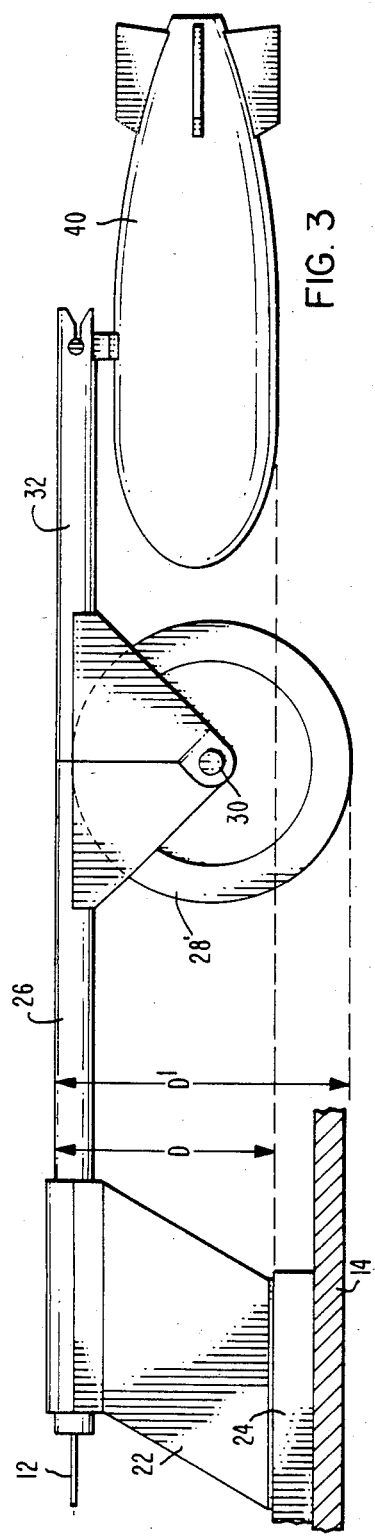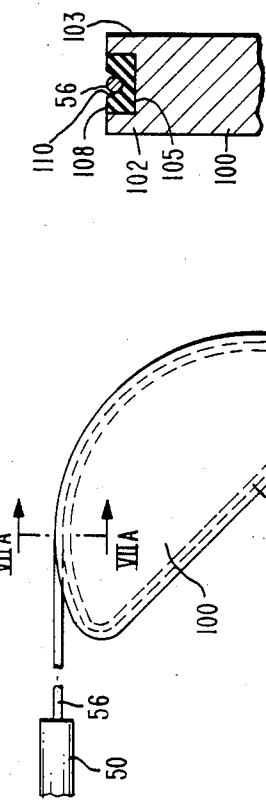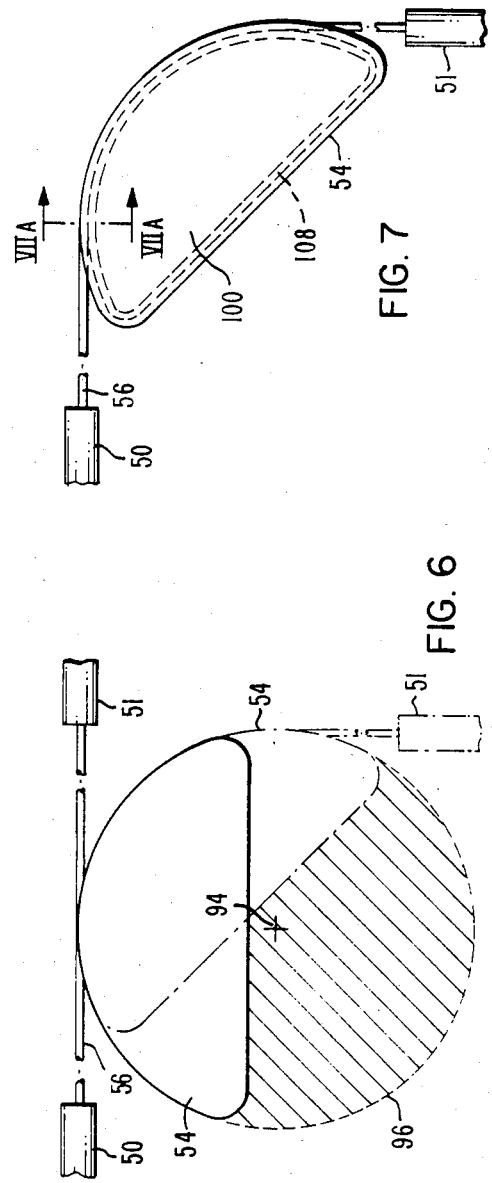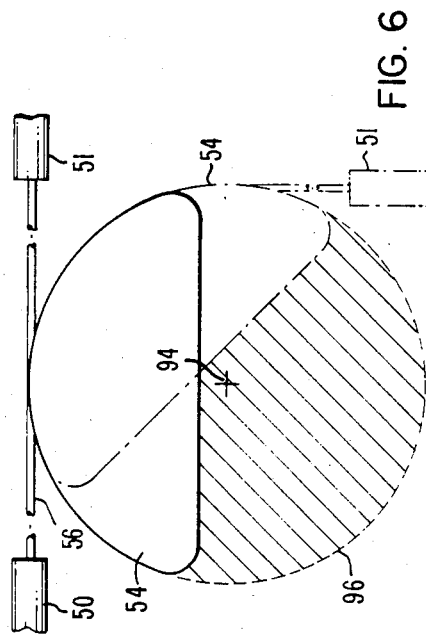
FIG. 3
FIG. 7A
FIG. 7
FIG. 6

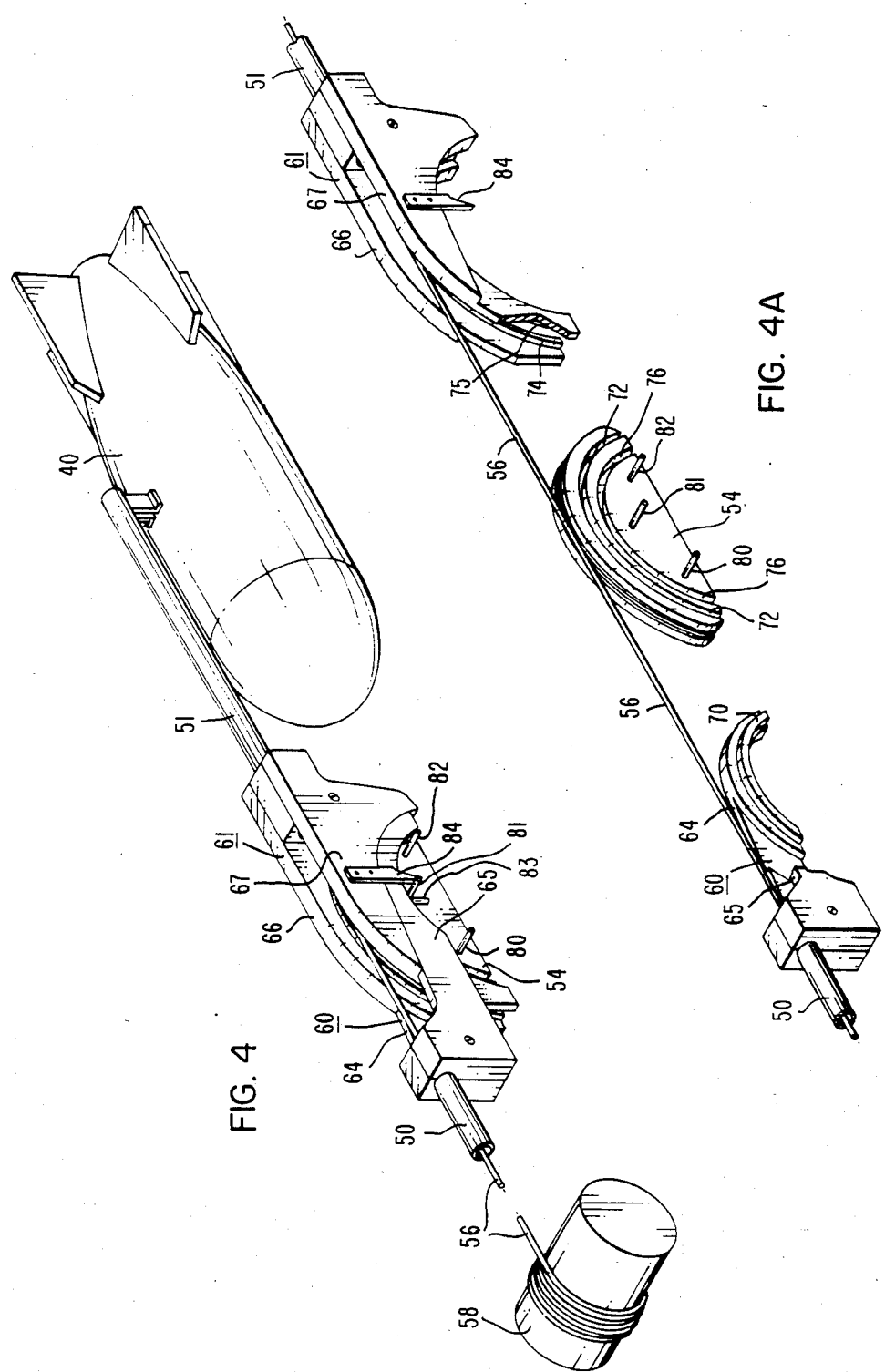

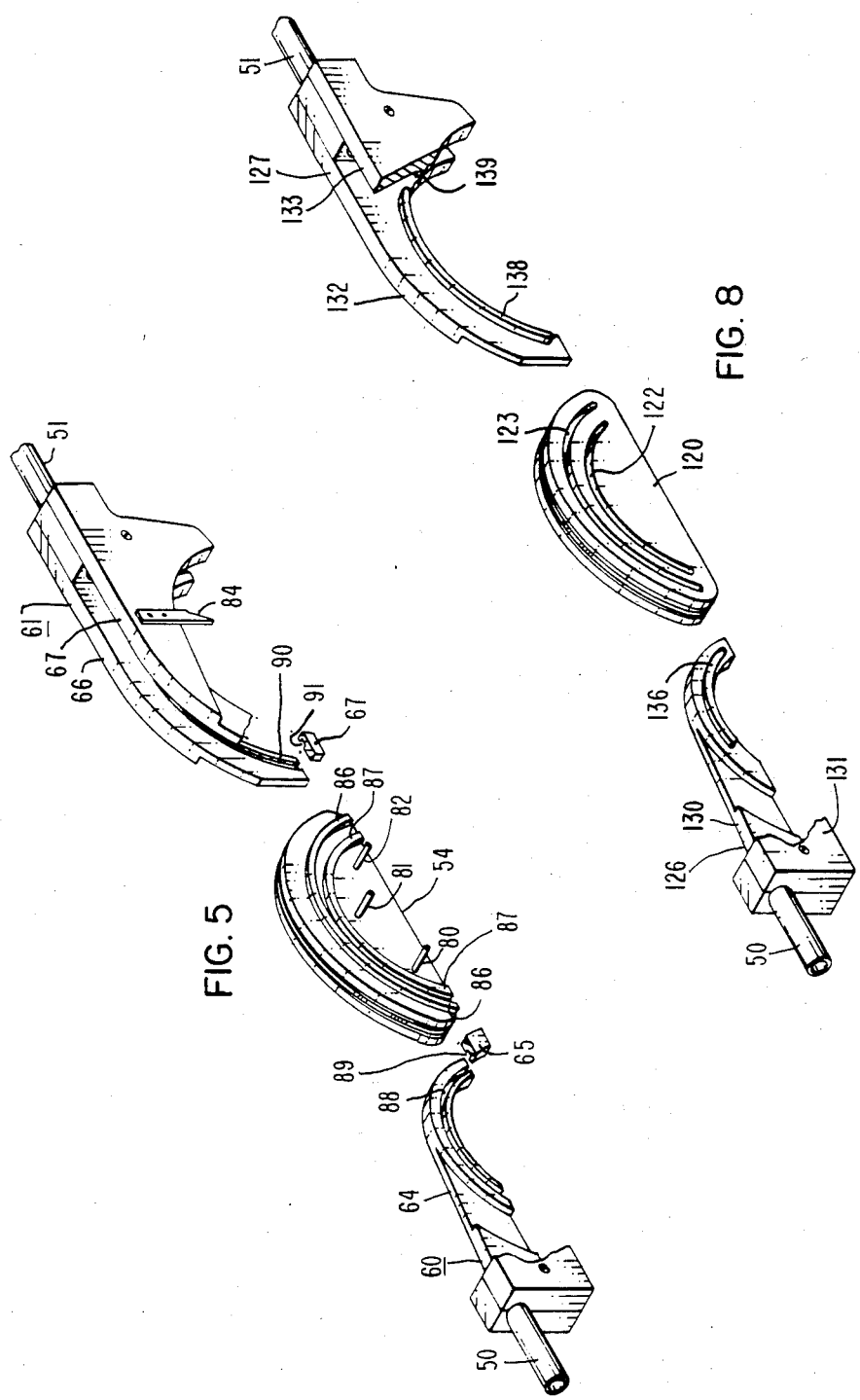

LOW PROFILE DEPLOYMENT/RETRIEVAL SYSTEM

GOVERNMENT CONTRACT

The Government has rights in this invention pursuant to Contract General Order No. 39614 awarded by the Department of the Navy.

BACKGROUND OF THE INVENTION

1. Field of the Invention

The invention in general relates to a towed body lauching and retrieval arrangement, and particularly to one which fits into a limited space.

2. Description of the Prior Art

In copending application Ser. No. 588,594 filed Mar. 12, 1984 and assigned to the same assignee as the present invention, a towed body deployment/retrieval system is described wherein the requirement for a conventional tow boom-carried sheave is eliminated.

The system described includes a first hollow arm with a sheave member rotatable about an axle which is disposed below the arm. A second hollow arm is mechanically coupled to the axle and is rotatable about the sheave member between a first position in which the arms are horizontally aligned, and a second position wherein second arm is vertical.

A cable wound upon a winch extends through the first arm, over the sheave, and through the second arm for connection to the towed body.

The previously described arrangement is extremely suitable for not only surface vessels for providing a low center of gravity system, but for other carriers which have a height restriction, such as the helicopter described in the aforementioned copending application.

The cable which is utilized is of a certain strength and diameter compatible with the tow requirements. If a particular mission requires the use of a heavier tow cable, then a greater diameter sheave is dictated. This is due to the fact that the life of the cable depends not only upon the number of deployment/retrieval cycles, but also upon how severe a bend the cable makes over the sheave. The radius of curvature of the sheave should be as large as possible to prolong the cable life.

Due to the limited height requirement, the sheave diameter of the previously described system is limited. The present invention provides a similar retrieval/deployment system which can use a heavier cable over an effectively increased radius of curvature sheave in the same space requirement as the previous system.

SUMMARY OF THE INVENTION

The low profile deployment/retrieval system of the present invention includes first and second hollow arm members as well as a slip boundary sheave having the general outline of a segment of a circle, with the body of the sheave having a peripheral channel extending around the circumference of the body between side wall portions. An endless track means is situated within the channel and is movable relative to the body. The first and second arms are constructed and arranged to be in cooperative limited rotatable engagement with the body of the slip boundary sheave. A winchable cable extends through the first hollow arm member, over a portion of the endless track means in a groove thereof, and through the second hollow arm member. A tethered body is connected to the end of the cable which passes through the second hollow arm member.

BRIEF DESCRIPTION OF THE DRAWINGS

FIG. 3 illustrates the prior art system used with a greater diameter sheave;

FIG. 4 illustrates one embodiment of the present invention, and FIG. 4A illustrates an exploded view of the arrangement of FIG. 4;

FIG. 5 is a view as in FIG. 4A, however showing a slight modification to the arrangement;

FIG. 6 illustrates a general outline of the slip boundary sheave in two different positions during an operation;

FIG. 7 is a side view of a slip boundary sheave, and FIG. 7A is an enlarged view along line VIIA—VIIA of FIG. 7; and FIGS. 8, 8A and 8B illustrate yet another embodiment of the invention.

DESCRIPTION OF THE PREFERRED EMBODIMENTS

Figure 1:
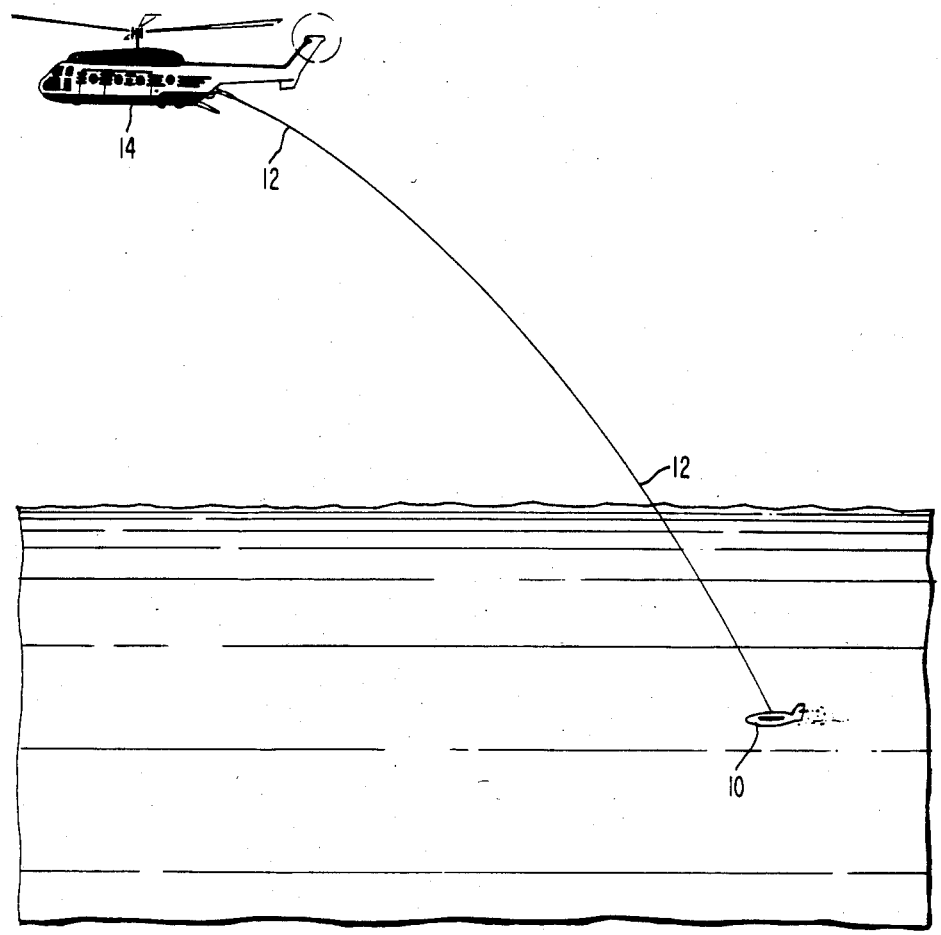
FIG. 1 illustrates a typical use for a towed body deployment/retrieval system.

FIG. 1 illustrates an operation wherein a towed body in the form of an underwater vehicle 10, containing data gathering instrumentation, is towed, via an electromechanical cable 12, by a towing vehicle illustrated as a helicopter 14. The instrumentation signals are transmitted up the cable 12 to recording and/or display equipment aboard the helicopter. After the mission, the towed body 10 is retrieved and placed on board the towing vehicle as depicted in FIGS. 2A-2D which illustrate some basic features of the deployment/retrieval system described in the previously mentioned patent application.

The prior art deployment/retrieval system 20, shown within helicopter 14, includes a base member 22 which is movable along a track 24. Base 22 supports a first hollow arm 26 which in turn carries a sheave 28 rotatable about axle 30 disposed below the arm 26. A second hollow arm 32 constituting a cable follower arm is rotated about sheave 28 and axle 30 between a first position wherein the arms are horizontally aligned, and a second position wherein arm 32 is vertical.

Cable 12 from the towed vertical passes through arm 32, over sheave 28, through arm 26 and is wound upon a winch 34 at the other end of track 24 and located near an operator's console 36.

Figure 2A:
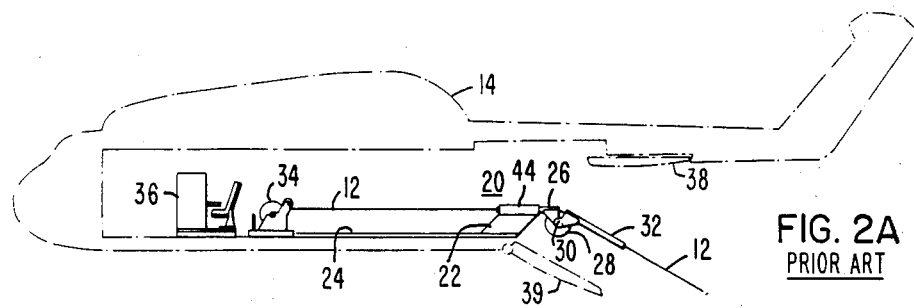
FIGS. 2A-2D illustrate a prior art deployment/retrieval system as described in the aforementioned patent application.
Figure 2B:
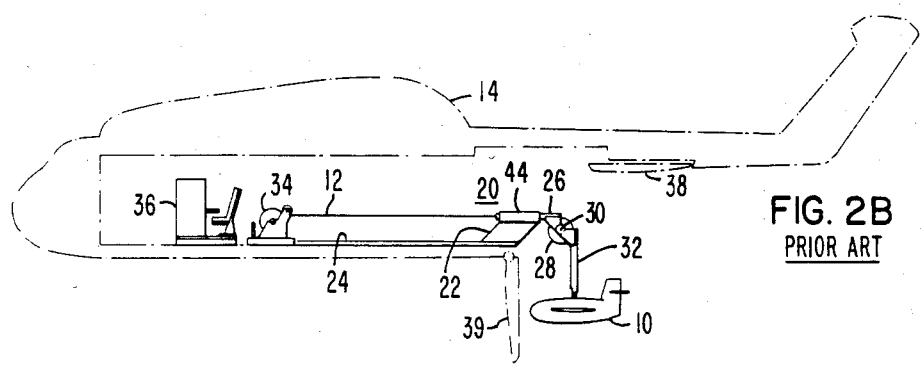

Helicopter cargo doors 38 and 39 are illustrated in the towing position in FIG. 2A. Upon retrieval once the towed vehicle passes the air/sea interface, or even prior thereto, cargo door 38 assumes the position as illustrated in FIG. 2B and arm 32 assumes the vertical position so that the towed vehicle 10 may be reeled in and captured.

Figure 2C:
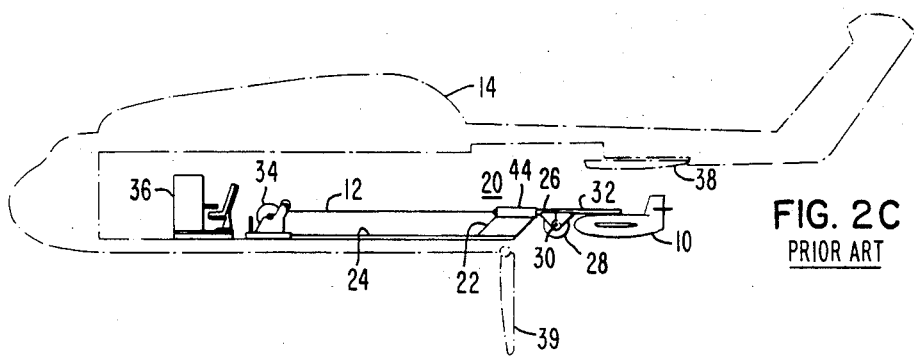

Once the capture has taken place, the cable is further reeled in to thereby bring arm 32 to the horizontal position illustrated in FIG. 2C whereupon the two arms may be latched together so as to relieve some of the tension on the cable 12.

Figure 2D:
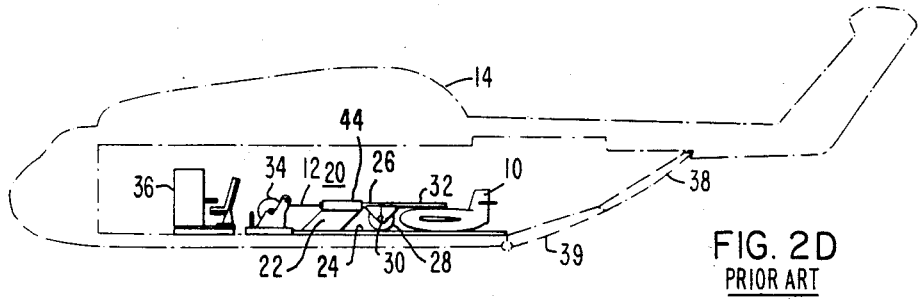

After capture, and as illustrated in FIG. 2D, the assembly is moved along the track to the interior of the helicopter whereinupon the cargo doors 38 and 39 may be closed. Deployment of the towed vehicle 10 can be accomplished by reversing the sequence of operation illustrated in FIGS. 2A–2D.

FIG. 3 duplicates a portion of the apparatus of FIGS. 2A–2D to demonstrate a problem which may arise for some mission requirement. In the previous figures, the sheave diameter D was of such magnitude so as to fit in the space between the arm and the helicoper floor. If a different towed vehicle such as 40 is required, necessitating a larger diameter tow cable due to excessive weight of the towed vehicle, for example, then a corresponding larger diameter sheave 28' will be required to prolong cable life. Diameter D' of sheave 28' is of such dimension that it would extend below the floor of the helicopter and accordingly would not fit into the dictated space requirement. The larger diameter sheave additionally would not be suitable for the apparatus to fit into limited size shipping or other types of containers. The present invention accomplishes the objectives of a low profile deployment/retrieval system for using larger diameter cables, and to this end reference is made to FIG. 4.

The arrangement of FIG. 4 includes a first hollow arm 50 and a second hollow arm 51 movable relative thereto as in the prior art arrangement, however with the difference that the arms rotate relative to a slip boundary sheave 54, as will be explained. Although not illustrated arm 50 may be carried by a base member moveable along a track as in the prior art system. A heavy cable 56 is wrapped around winch 58 and passes through the hollow arms as well as over slip boundary sheave 54 and is connected at its other end to the towed vehicle 40.

With additional reference to FIG. 4A, arms 50 and 51 include at the ends thereof respective forked fittings 60 and 61 each including respective arcuate branches or segments 64, 65 for fitting 60 and 66, 67 for fitting 61.

As best seen in FIG. 4A, the inner surfaces of the segments 64–67 (65 is not illustrated, for clarity) in conjunction with the outer surface of slip boundary sheave 54 form a complementary mating key and keyway track system to allow relative rotational movement of the arms about the sheave member. Thus arcuate segments 64 and 65 include respective arcuate projections, only one of which, 70, is illustrated and which engage arcuate grooves on either side of the slip boundary sheave 54, groove 72 being illustrated, it being understood that a complementary groove is located on the unseen face of the slip boundary sheave.

Similarly, arcuate segments 66 and 67 include respective arcuate projections 74 and 75 for complementary engagement with arcuate grooves on the sheave, one such groove 76 being illustrated on the visible side.

Means are provided for limiting the relative rotational movement of the arms about the slip boundary sheave. This may be accomplished with the provision of a plurality of pegs 80–82 projecting from the side surface of the sheave. Arcuate segment 65 of fitting 60 includes a peg 83 depending from the underside thereof and arcuate segment 67 of fitting 61 includes a downwardly projecting tab 84. The arrangement is operable such that arm 51 may rotate relative to slip boundary sheave 54 between one limit where tab 84 contacts and is stopped by peg 81, and an opposite extreme wherein tab 84 contacts and is stopped by peg 82.

Movement of the slip boundary sheave 54 relative to the arm 50 is constrained between limits wherein downwardly projecting peg 83 connected to arcuate segment 65 is moveable between, and stopped by, pegs 80 and 81.

FIG. 5 is similar to FIG. 4A with the exception that instead of grooves, the side surface of slip boundary sheave 54 includes projections 86 and 87 and the arcuate segments 64–67 include grooves of which two, 88 and 90 can be seen, for complementary sliding engagement with the projections of the sheave member.

FIG. 6 illustrates the slip boundary sheave 54 in two different positions during use. When arms 50 and 51 are in horizontal alignment (as in FIG. 2C), slip boundary sheave 54 is positioned as indicated by the solid outline. When arms 50 and 51 are in a perpendicular orientation (as in FIG. 2B) then the slip boundary sheave 54 is as indicated by the dot-dash outline. For clarity for forked fittings making sliding engagement with the sheave are not illustrated.

The slip boundary sheave does not include a physical axle but instead is rotatable during use about an effective center 94 which may be located outside of the sheave contour which is generally a D-shaped segment of a circle. The curvature of the slip boundary sheave is such as to accommodate a larger diameter cable for which an equivalent circular sheave 96 (shown shaded) would normally be required. FIG. 6 however illustrates that the present invention utilizing the slip boundary sheave 54 results in an arrangement with a much lower profile than with an equivalent circular sheave. In a stowed position, the slip boundary sheave 54 exhibits a height dimension which is less than half the circular sheave diameter. Any one of a number of slip boundary sheaves may be utilized, one example being illustrated in FIG. 7 and FIG. 7A, which is an enlarged view along the line VIIA—VIIA of FIG. 7

Slip boundary sheave 54 includes a body 100 which has side wall portions 102 and 103 defining a peripheral channel 105 extending all around the sheave.

An endless track means is disposed within channel 105 and is movable relative to the body 100. In one embodiment, the endless track means takes the form of an endless belt 108 having means for receiving the cable 56, such means taking the form of a peripheral groove 110. In order to enhance sliding engagement between the endless belt 108 and the peripheral channel 105, it is preferred that one or both of these members be fabricated of a low friciton material such as polytetrafluoroethylene.

FIG. 8 is an exploded view of another embodiment of the present invention. A slip boundary sheave 120 includes two concentric grooves 122 and 123 which are formed in the body of the sleave and which are terminated inside the D-shaped contour of the sheave. Another similar set of groove on the other side of the sheave would be included but are not visible in FIG. 8. The ends of arms 50 and 51 include respective forked fittings 126 and 127 with fitting 126 including two arcuate segments 130 and 131 (shown fragmented), while forked fitting 127 includes segments 132 and 133 (shown fragmented). Each of these segments include respective arcuate projection, two of which 136 and 138 are seen, which mate within respective grooves of the slip boundary sheave 120. Projection 136 would fit in a groove on the opposite face of sheave 120 and corresponding to groove 122 and projection 138 would fit into a groove corresponding to groove 123.

Figure 8A:
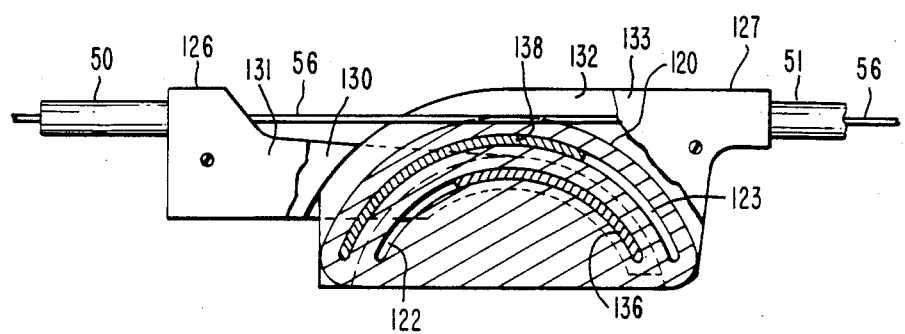
Figure 8B:
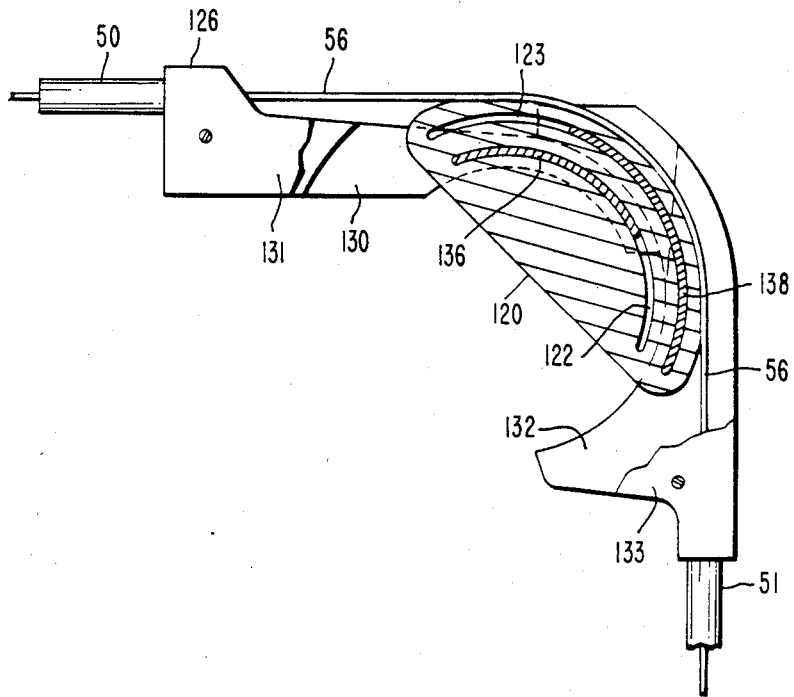

Since the grooves are of limited arc length, the arrangement will automatically provide for limit stops during relative rotational movement of the apparatus. For example, FIG. 8A depicts projections 136 and 138, shown shaded, at a first limit position within respective grooves 122 and 123 wherein the arms 50 and 51 of FIG. 8 would be in a horizontal configuration. FIG. 8B illustrates the slip boundary sheave 120 rotated to a different position wherein segments 136 and 138 have moved within their respective grooves to a second limit position, such arrangement eliminating the requirement for external peg and tab stops in FIG. 4.

Accordingly, the present invention provides for an arrangement which utilizes a slip boundary sheave which is supported by the arms while it rotates about its effective center. The slip boundary sheave can accommodate the same cable as a much larger dimension circular sheave but will stow within a limited clearance space constraint which would not be able to accommodate the larger circular sheave.

I claim:

1. A deployment/retrieval system for a tethered body comprising:
   (A) first and second hollow arm members;
   (B) a slip boundary sheave having the general outline of a segment of a circle, the body of said sheave having a peripheral channel extending around the circumference thereof between side wall portions;
   (C) endless track means within said channel and movable relative to said body, said track means including means for receiving a cable;
   (D) said first and second arm members being constructed and arranged so as to be in cooperative rotatable engagement with said body of said slip boundary sheave;
   (E) each said arm member including a respective forked fitting at an end thereof, each forked fitting including two arcuate segments straddling said slip boundary sheave;
   (F) said slip boundary sheave including on either side thereof a plurality of arcuate concentric grooves;
   (G) each said arcuate segment of said forked fittings including an arcuate projection which mates with a respective one of said arcuate grooves of said slip boundary sheave to allow for said rotatable engagement;
   (H) winchable cable means extending through said first arm member, over a portion of said endless track means and through said second arm member; and
   (I) a tethered body connected to the end of said cable means.

2. Apparatus according to claim 1 wherein:
   (A) said segment is less than a semicircle; and
   (B) said slip boundary sheave is rotatable about an imaginary axis displaced from, and outside the contour of said sheave.

3. Apparatus according to claim 1 which includes:
   (A) means for limiting movement of said arms relative to said slip boundary sheave.

4. Apparatus according to claim 1 wherein:
   (A) the ends of said grooves terminate within the contour of said slip boundary sheave.

5. Apparatus according to claim 1 which includes:
   (A) means for limiting relative rotatable movement of said arcuate segments and said slip boundary sheave.

6. A deployment/retrieval system for a tethered body comprising:
   (A) first and second hollow arms members;
   (B) a slip boundary sheave having the general outline of a segment of a circle, the body of said sheave having a peripheral channel extending around the circumference thereof between side wall portions;
   (C) endless track means within said channel and movable relative to said body, said track means including means for receiving a cable;
   (D) said first and second arm members being constructed and arranged so as to be in cooperative rotatable engagement with said body of said slip boundary sheave;
   (E) each said arm member including a respective forked fitting at an end thereof, each forked fitting including two arcuate segments straddling said slip boundary sheave;
   (F) said slip boundary sheave including on either side thereof a plurality of arcuate concentric projections;
   (G) each said arcuate segment of said forked fittings including an arcuate groove which mates with a respective one of said arcuate projections of said slip boundary sheave to allow for said rotatable engagement;
   (H) winchable cable means extending through said first arm member, over a portion of said endless track means and through said second arm member; and
   (I) a tethered body connected to the end of said cable means.

7. Apparatus according to claim 6 which includes
   (A) means for limiting relative rotatable movement of said arcuate segments and said slip boundary sheave.

* * * * *